(12) United States Patent
Kwon (10) Patent No.: US 9,738,304 B2
(45) Date of Patent: Aug. 22, 2017

(54) STEERING COLUMN OF VEHICLE (71) Applicant: MANDO CORPORATION, Pyeongtaek-si, Gyeonggi-do (KR)

(72) Inventor: Kyung Tae Kwon, Seongnam-si (KR)

(73) Assignee: Mando Corporation, Pyeongtaek-si, Gyeonggi-do (KR)

( * ) Notice: Subject to any disclaimer, the term of this patent is extended or adjusted under 35 U.S.C. 154(b) by 0 days.

(21) Appl. No.: 14/971,358

(22) Filed: Dec. 16, 2015

(65) Prior Publication Data
US 2016/0176434 A1    Jun. 23, 2016

(30) Foreign Application Priority Data

Dec. 18, 2014  (KR) ........................ 10-2014-0182854

(51) Int. Cl.
*B62D 1/184* (2006.01)
*B62D 1/19* (2006.01)

(52) U.S. Cl.
CPC ............ *B62D 1/184* (2013.01); *B62D 1/197* (2013.01)

(58) Field of Classification Search
CPC ......... B62D 1/184; B62D 1/187; B62D 1/197
See application file for complete search history.

(56) References Cited

U.S. PATENT DOCUMENTS

| 6,419,269 B1* | 7/2002 | Manwaring | B62D 1/195 |
| | | | 280/775 |
| 6,659,504 B2* | 12/2003 | Manwaring | B62D 1/195 |
| | | | 280/775 |
| 7,484,430 B2* | 2/2009 | Schulz | B62D 1/184 |
| | | | 280/777 |
| 7,533,594 B2* | 5/2009 | Menjak | B62D 1/184 |
| | | | 280/775 |
| 7,685,903 B2* | 3/2010 | Streng | B62D 1/184 |
| | | | 74/492 |
| 7,827,880 B2* | 11/2010 | Riefe | B62D 1/184 |
| | | | 280/777 |

(Continued)

FOREIGN PATENT DOCUMENTS

| KR | 10-0622769 B1 | 9/2006 |
| KR | 10-2013-0098813 A | 9/2013 |
| KR | 10-2014-0094266 A | 7/2014 |

OTHER PUBLICATIONS

Korean Office Action issued in Korean Application No. 10-2014-0182854, with Concise Statement of Relevance.

*Primary Examiner* — Laura Freedman
(74) *Attorney, Agent, or Firm* — McDermott Will & Emery LLP (57) ABSTRACT

Disclosed is steering column of a vehicle including: a plate bracket that surrounds a distance bracket that is coupled to an outer column, has tilt slits on opposite sides thereof, and has a locking gear in any one of opposite surfaces of the tilt slits; an adjusting bolt that has a body passing through the tilt slits and the distance bracket from a head thereof, and in which a fixed cam and an actuating cam are coupled to a side of the body opposite to the head in order to press or release opposite sides of the plate bracket; a locking member into which the adjusting bolt is inserted and which is coupled to or released from the locking gear; and a resilient body that is coupled to the locking member and the adjusting bolt in order to apply a resilient restoring force to the locking member.

9 Claims, 8 Drawing Sheets

(56) References Cited

U.S. PATENT DOCUMENTS

| | | | |
|---|---|---|---|
| 7,861,615 B2 * | 1/2011 | Harris | B62D 1/184 280/775 |
| 8,505,408 B2 * | 8/2013 | Havlicek | B62D 1/184 280/775 |
| 8,657,338 B2 * | 2/2014 | Buzzard | B62D 1/184 280/775 |
| 8,671,795 B2 * | 3/2014 | Ozsoylu | B62D 1/184 74/493 |
| 8,888,131 B2 * | 11/2014 | Anspaugh | B62D 1/184 280/775 |

* cited by examiner

STEERING COLUMN OF VEHICLE

CROSS-REFERENCE TO RELATED APPLICATION

This application claims priority from and the benefit under 35 U.S.C. §119(a) of Korean Patent Application No. 10-2014-0182854, filed on Dec. 18, 2014, which is hereby incorporated by reference for all purposes as if fully set forth herein.

BACKGROUND OF THE INVENTION

1. Field of the Invention

The present invention relates to a steering column of a vehicle, and more particularly, to a steering column of a vehicle that includes a locking gear, a locking member, and a resilient body such that the locking member is coupled to the locking gear and the locking member is resiliently supported by the locking gear in a rotational direction of an adjusting bolt so that the driver can be protected as the steering column is stably fixed when the vehicle has a collision.

2. Description of the Prior Art

Figure 1:
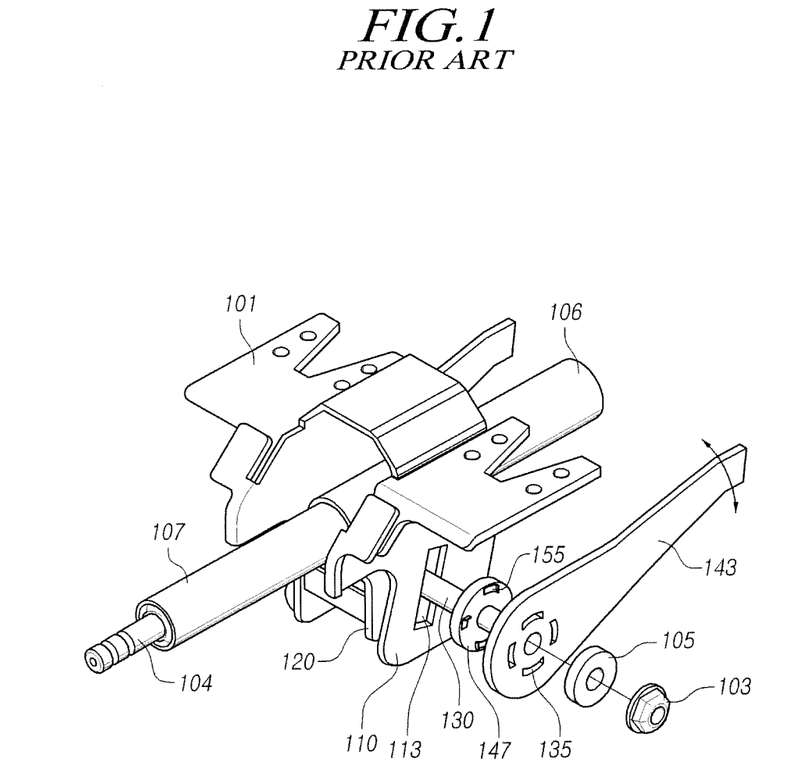
FIG. 1 is an exploded perspective view illustrating a part of a steering column of a vehicle according to the related art.

FIG. 1 is an exploded perspective view of a part of a steering column of a vehicle according to the related art.

Referring to FIG. 1, a distance bracket 120 is coupled to an outer column 106 that surrounds an inner column 107, into which a steering shaft 104 is inserted, and a mounting bracket 101 with a plate bracket 110 is coupled to a shell body of the vehicle.

Through-holes (not illustrated) are formed on opposite surfaces of the distance bracket 120, which is inserted between the plate bracket 110.

An adjusting bolt 130 extends to pass through the through-holes (not illustrated) of the distance bracket 120 and tilt slits 113 formed in the plate bracket 110, and a fixed cam 147 is installed in the extending adjusting bolt 130 to increase or decrease the fastening force between the plate bracket 110 and the distance bracket 120 by pressing a side surface of the plate bracket 110.

An inclination part insertion groove 135, into which an inclination part 155 formed on one surface of the fixed cam 147 is inserted, is formed in an adjusting lever 143, and a washer 105 for supporting rotation and a nut 103 coupled to the adjusting bolt 130 are coupled to an end of the adjusting bolt 130.

The inclination part insertion groove 135 of the adjusting lever 143 and the inclination part 155 of the fixed cam 147 have structures that correspond to each other so that the fixed cam 147 is axially moved due to the inclination 155 if the adjusting lever 143 is rotated by operating the adjusting lever 143, and accordingly, a tilting operation is performed by pressing or releasing the distance bracket 120 with the plate bracket 110.

However, in the steering column of a vehicle according to the related art, the steering column is fixed by a frictional support force of the plate bracket and the distance bracket so that the driver may be injured when the vehicle collides because the steering column cannot be stably fixed.

SUMMARY OF THE INVENTION

Therefore, the present invention has been made in an effort to solve the above-mentioned problems, and provides a steering column of a vehicle that includes a locking member and a locking gear such that the steering column can be fixed by a frictional support force between a plate bracket and a distance bracket, and a coupling support force between the locking member and a locking gear engaged with the locking member as the locking member is engaged with the locking gear so that the driver can be protected by preventing a steering shaft from being popped up.

The present invention also provides a steering column of a vehicle that includes a locking member and a resilient body coupled to an adjusting bolt such that the locking member is coupled to a locking gear while being resiliently supported in the rotational direction of the adjusting bolt so that damage to the locking member, a locking gear, or an adjusting lever can be prevented as the resilient body is further compressed by a difference between a ridge and a gulley of the locking gear even if the locking member is engaged with the ridge of the locking gear, and that can be stably locked as the locking member resiliently supports the locking gear when the vehicle collides.

The aspect of the present invention is not limited thereto, and other unmentioned aspects of the present invention may be clearly appreciated by those skilled in the art from the following descriptions.

In accordance with an aspect of the present invention, there is provided a steering column of a vehicle including: a plate bracket that surrounds a distance bracket that is coupled to an outer column, has tilt slits on opposite sides thereof, and has a locking gear in any one of opposite surfaces of the tilt slits; an adjusting bolt that has a body passing through the tilt slits and the distance bracket from a head thereof, and in which a fixed cam and an actuating cam are coupled to a side of the body opposite to the head in order to press or release opposite sides of the plate bracket; a locking member into which the adjusting bolt is inserted and which is coupled to or released from the locking gear; and a resilient body that is coupled to the locking member and the adjusting bolt in order to apply a resilient restoring force to the locking member.

According to the present invention, the steering column of the vehicle includes a locking member and a locking gear, which are engaged with each other. As a result, at the time of collision of the vehicle, the frictional support force between the plate bracket and the distance bracket and the coupling support force between the locking member and the locking gear engaged with each other can fix the steering column and prevent the steering shaft from being popped up, to thereby protect the driver.

Further, the steering column of the vehicle includes a resilient body coupled to the locking member and an adjusting bolt such that the locking member is coupled to the locking gear while supporting the locking gear in the rotational direction of the adjusting bolt. Therefore, even when the locking member is engaged with the ridge of the locking gear, the resilient body is further compressed as much as a difference between a ridge and a gulley of the locking gear to prevent the locking member, the locking gear, or an adjusting lever from being broken. In addition, when the vehicle collides, the locking member resiliently supports the locking gear so that the steering column of the vehicle can be stably locked.

BRIEF DESCRIPTION OF THE DRAWINGS

The above and other objects, features, and advantages of the present invention will be more apparent from the following detailed description taken in conjunction with the accompanying drawings, in which.

DETAILED DESCRIPTION OF THE EXEMPLARY EMBODIMENTS

Hereinafter, exemplary embodiments of the present invention will be described in detail with reference to the accompanying drawings. Throughout the specification, it is noted that the same or like reference numerals denote the same or like components even though they are provided in different drawings. Further, in the following description of the present invention, a detailed description of known functions and configurations incorporated herein will be omitted when it may make the subject matter of the present invention rather unclear.

In addition, terms, such as first, second, A, B, (a), (b) or the like may be used herein when describing components of the present invention. These terms are merely used to distinguish one structural element from other structural elements, and a property, an order, a sequence and the like of a corresponding structural element are not limited by the term. It should be noted that if it is described in the specification that one component is "connected," "coupled" or "joined" to another component, a third component may be "connected," "coupled," and "joined" between the first and second components, although the first component may be directly connected, coupled or joined to the second component.

Figure 2:
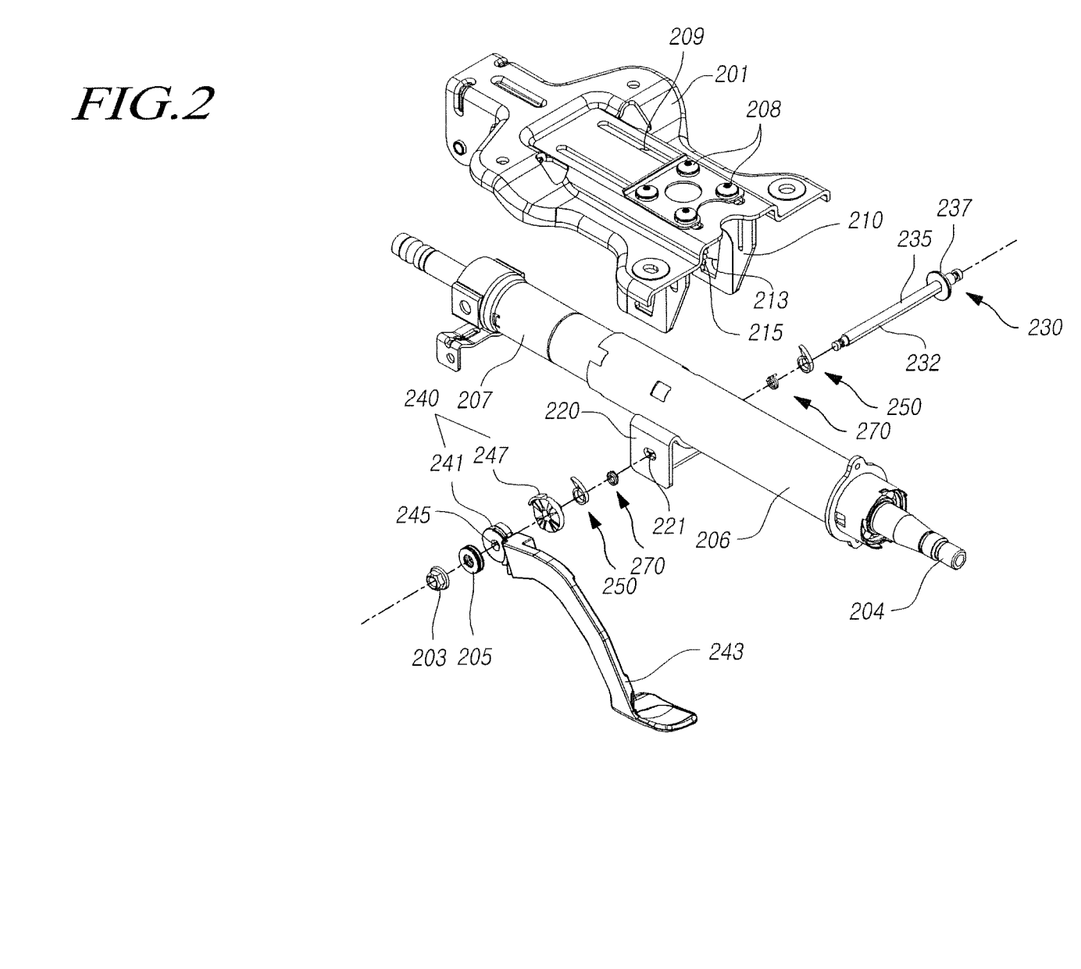
FIG. 2 is an exploded perspective view illustrating a part of a steering column of a vehicle according to an embodiment of the present invention.
Figure 3:
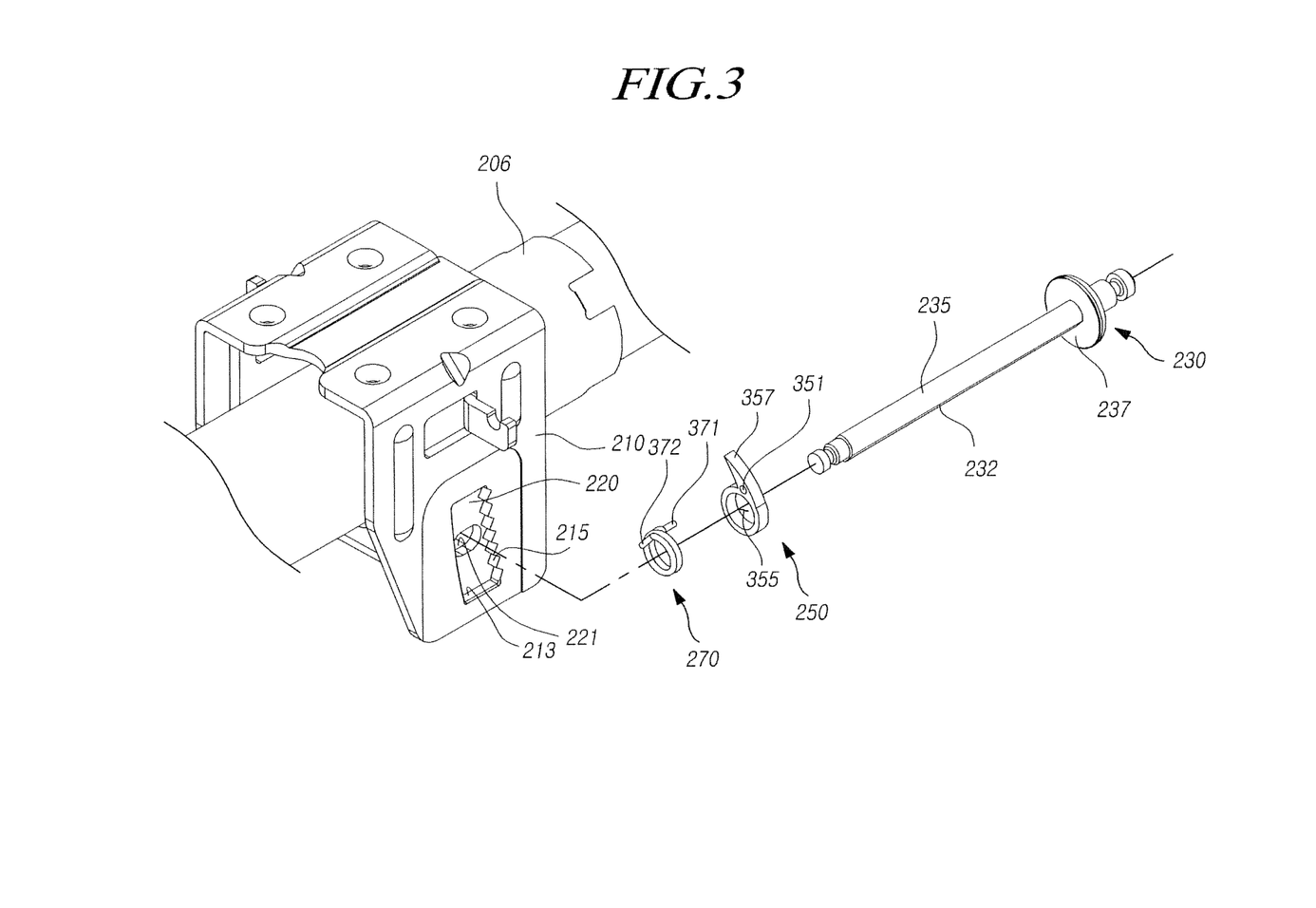
FIG. 3 is an exploded perspective view illustrating a part of FIG. 2.
Figure 4:
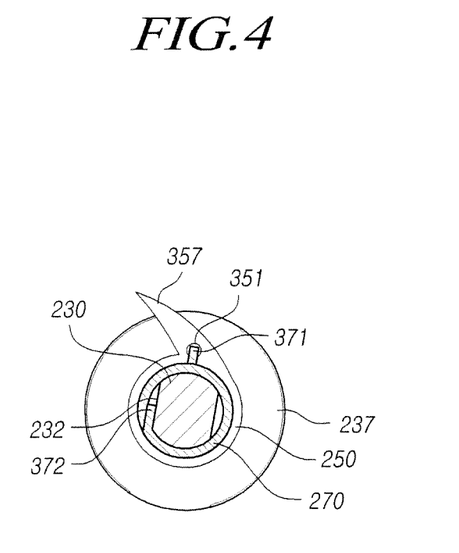
FIG. 4 is a side view illustrating a state in which an adjusting bolt, a locking gear, and a resilient body are coupled to each other.
Figure 5:
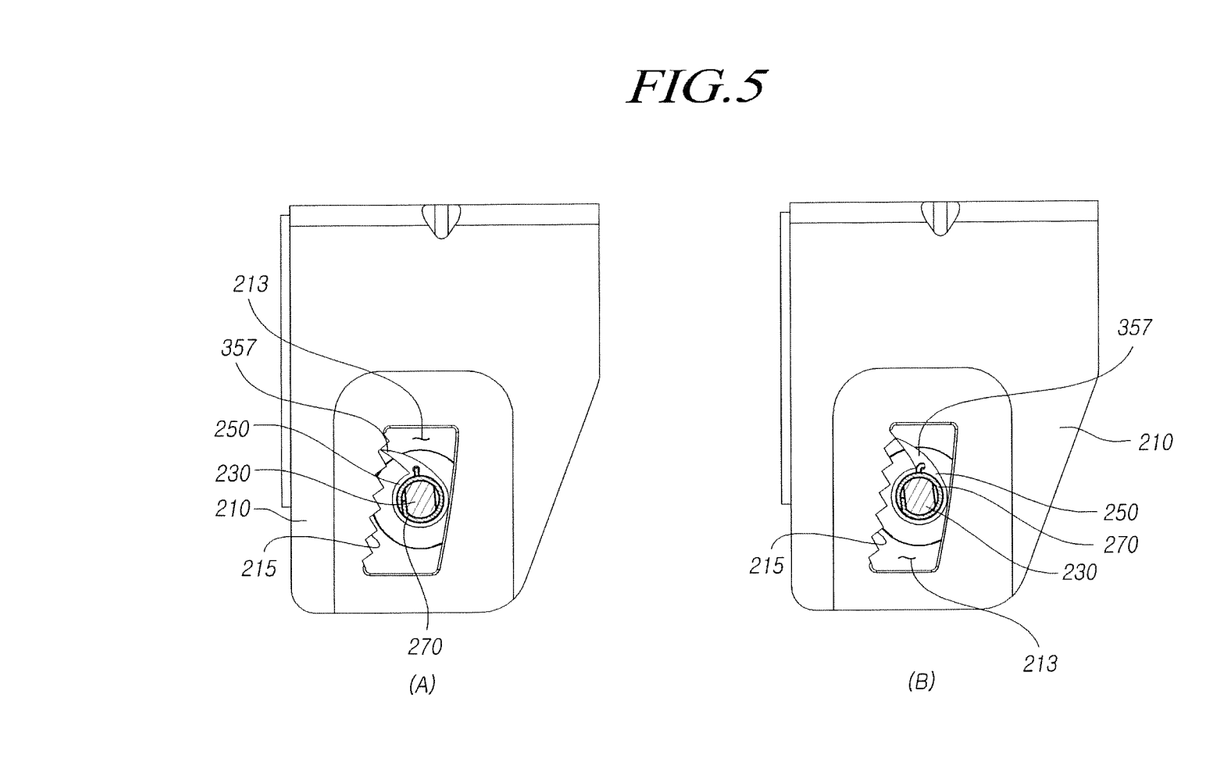
FIG. 5 is a view illustrating a state in which a locking member is coupled to the locking gear.
Figure 6:
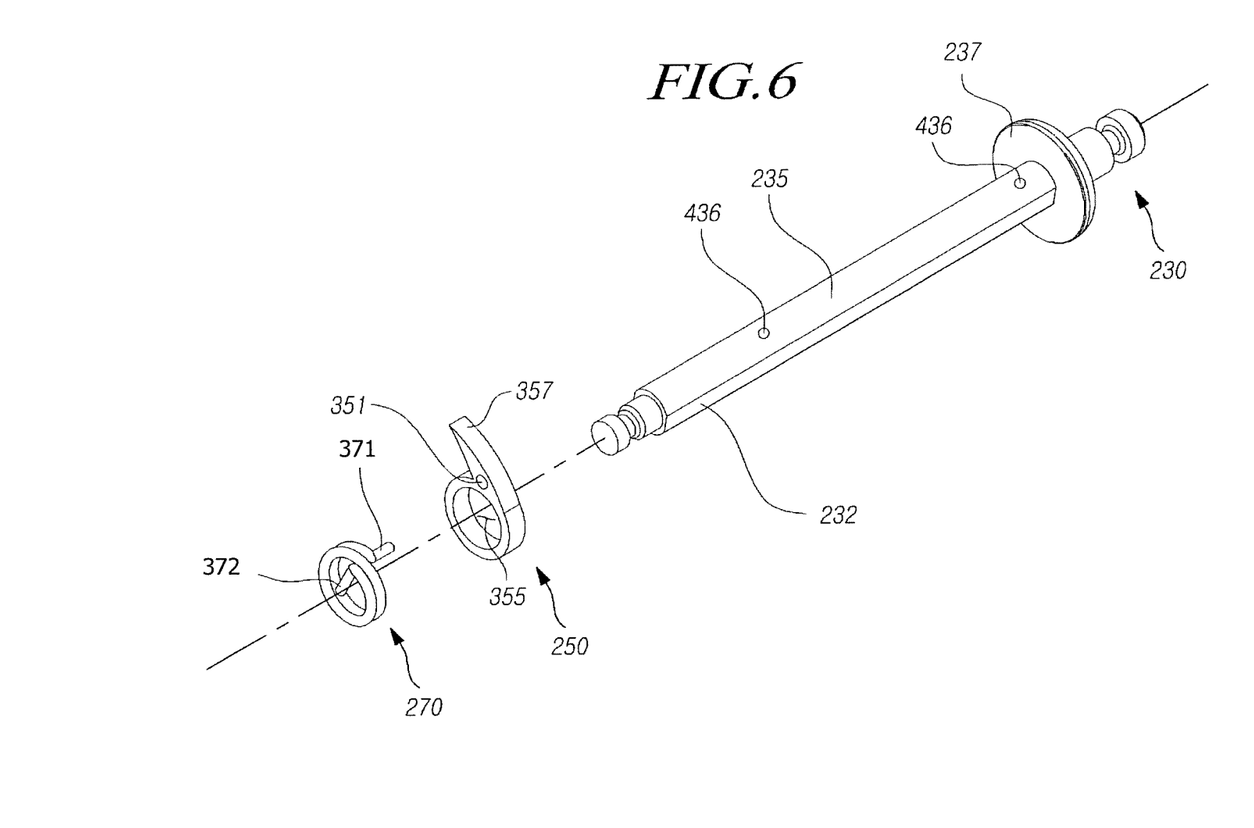
FIG. 6 is an exploded perspective view illustrating a part of a steering column of a vehicle according to another embodiment of the present invention.
Figure 7:
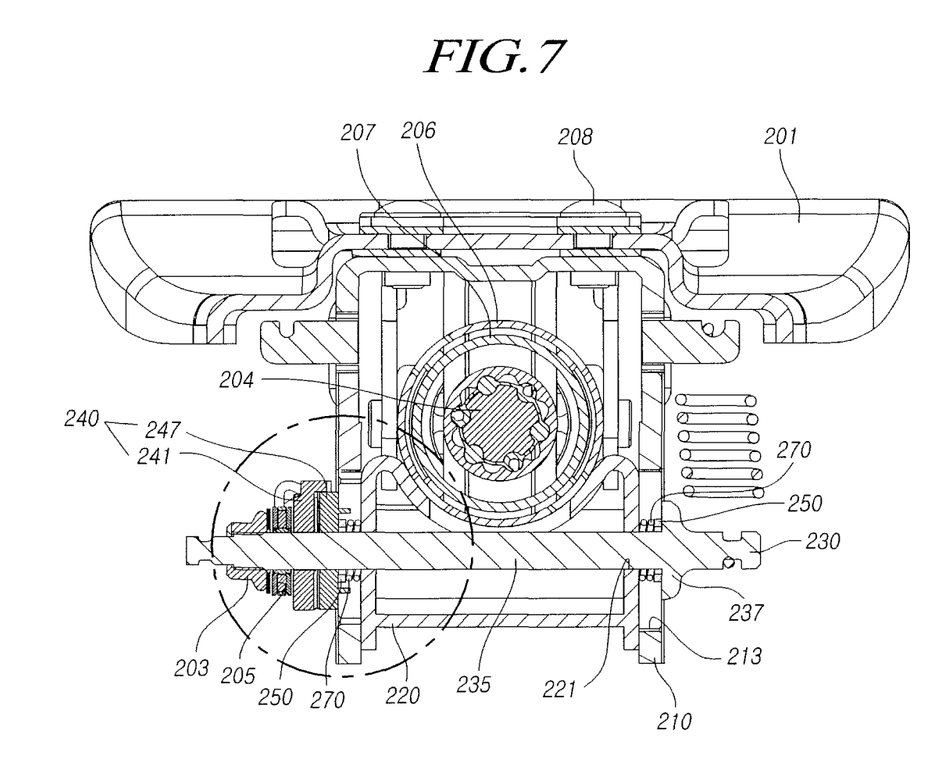
FIG. 7 is a sectional view of FIG. 2.
Figure 8:
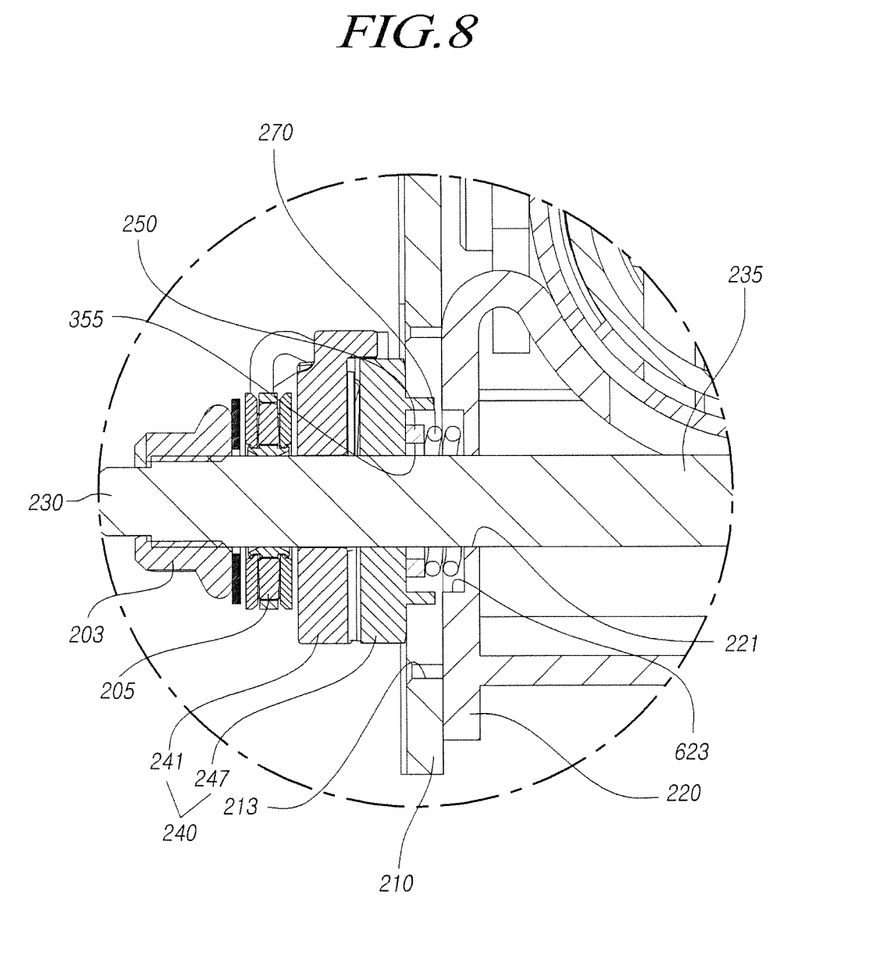
FIG. 8 is an exploded perspective view illustrating a part of a steering column of a vehicle according to another embodiment of the present invention.

FIG. 2 is an exploded perspective view illustrating a part of a steering column of a vehicle according to an embodiment of the present invention. FIG. 3 is an exploded perspective view illustrating a part of FIG. 2. FIG. 4 is a side view illustrating a state in which an adjusting bolt, a locking gear, and a resilient body are coupled to each other. FIG. 5 is a view illustrating a state in which a locking member is coupled to the locking gear. FIG. 6 is an exploded perspective view illustrating a part of a steering column of a vehicle according to another embodiment of the present invention. FIG. 7 is a sectional view of FIG. 2. FIG. 8 is an exploded perspective view illustrating a part of a steering column of a vehicle according to another embodiment of the present invention.

As illustrated in the drawings, a steering column of a vehicle according to an embodiment of the invention includes: a plate bracket 210 that surrounds a distance bracket 220 having through-holes 221 and coupled to an outer column 206, has tilt slits 213 on opposite sides thereof, and has locking gears 215 in one or both of the tilt slits 213; an adjusting bolt 230 that has a body 235 passing through the tilt slits 213 and the distance bracket 220 from a head 237 thereof, and in which a tilt locking member 240 that presses or releases opposite sides of the plate bracket 210 is coupled to a side of the body 235 opposite to the head 237; a locking member 250 into which the adjusting bolt 230 is inserted and which is coupled to or released from the locking gears 215; and a resilient body 270 that is coupled to the locking member 250 and the adjusting bolt 230 to apply a resilient restoring force to the locking member 250.

The distance bracket 220 is coupled to an outer side of the outer column 206 having a hollow portion, an inner column 207 is inserted into an inside of the outer column 206, and a steering shaft 204 is inserted into the inner column 207.

The distance bracket 220 is coupled to an outer peripheral surface of the outer column 206, is frictionally supported by the plate bracket 210 while being pressed by the plate bracket 210, and has a through-hole 221 through which the adjusting bolt 230 passes.

The plate bracket 210 is coupled to a mounting bracket 201 via impact energy absorption parts 208, has opposite surfaces that support the distance bracket 220 while pressing the distance bracket 220, and has the tilt slits 213 through which the adjusting bolt 230 is slid in a tilt direction on opposite surfaces thereof.

The impact energy absorption parts 208 pass through collapse slots 209 formed in the mounting bracket 201 and the plate brackets 210 to be coupled thereto, and absorb impact energy while being slid along the collapse slots 209 when the vehicle collides.

The adjusting bolt 230 is configured such that an inner surface of the head 237 supports one surface of the plate bracket 210 and the body 235 extends from the head 237 and passes through the tilt slits 213 of the plate brackets 210 and the through-hole 221 of the distance bracket 220.

The tilt locking member 240 that supports an opposite surface of the plate bracket 210, a washer 205, and a nut 203 are sequentially screw-coupled to an end of the adjusting bolt 230 opposite to the head 237.

The tilt locking member 240 includes an actuating cam 241, an adjusting lever 243 connected to the actuating cam 241, and a fixed cam 247 coupled to the actuating cam 241.

Meanwhile, if the driver rotates the actuating cam 241 connected to the adjusting lever 243 by releasing the adjusting lever 243, the distance between opposite surfaces of the plate bracket 210 becomes longer as the distance between the actuating cam 241 and the fixed cam 247 becomes shorter.

Subsequently, the plate bracket 210 is released such that a tilting operation of adjusting the distance bracket 220 upwards and downwards along the tilt slits 213 is performed while the distance bracket 220 is moved.

If the driver locks the adjusting lever 243 after the tilting operation, the tilt locking member 240 presses the plate bracket 210 so that the distance bracket 220 is frictionally supported by the plate bracket 210 and accordingly, the steering column is fixed.

The steering column is fixed by the frictional support force, and because a high impact is instantaneously applied if the vehicle collides, the steering shaft 204 cannot be supported by the friction between the plate bracket 210 and the distance bracket 220 so that the steering shaft 204 is popped up.

Accordingly, the locking member 250 and the locking gear 215 are provided to prevent the distance bracket 220 from being moved as an impact is applied when the vehicle collides.

Furthermore, the resilient body 270 coupled to the locking member 250 and the adjusting bolt 230, which will be described below, is further provided such that the locking member 250 may be stably coupled even if it is engaged with ridges of the locking gear 215 when the locking member 250 and the locking gear 215 are coupled to each other, and the resilient body 270 prevents the locking member 250 from being released from the locking gear 215 when the vehicle collides so that the distance bracket 220 may be stably fixed and accordingly, the steering shaft 204 can be prevented from popping up and safety of the driver can be guaranteed.

The locking member 250, the locking gear 215, and the resilient body 270 may be provided on one or opposite sides of the plate bracket 210, and an example in which they are provided on the opposite sides of the plate bracket 210 will be described in the present invention.

The locking member 250 has a hollow shape in which an insertion hole 355, into which the adjusting bolt 230 is inserted, is formed on an inner peripheral surface thereof, and has a locking boss 357 that protrudes from one side of an outer peripheral surface thereof to be coupled to or released from the locking gear 215.

Then, the locking boss 357 protrudes from one side of the locking member 250 towards the locking gear 215, and an end of the locking boss 357 is formed sharply such that the locking boss 357 is easily coupled to or released from the locking gear 215.

If the end of the locking boss 357 does not protrude in a rotation direction towards the locking gear 215, a stopping feeling may occur when the locking boss 357 is coupled to or released from the locking gear 215, and because the coupling or releasing may not be achieved in a severe case, the locking boss 357 protrudes from an outer peripheral surface of the locking member 250 towards the locking gear 215.

The locking member 250 has an assembly hole 351 to which the resilient body 270, which will be described below, is coupled on a side surface thereof.

Here, the insertion hole 355, into which the adjusting bolt 230 is inserted, is not fixed to an outer peripheral surface of the adjusting bolt 230, but the locking member 250 is coupled to the adjusting bolt 230 via the resilient body 270, which will be described below, so that the locking member 250 does not directly receive a rotational force even if the adjusting bolt 230 is rotated.

The locking gear 215 has a gear shape in which ridges and gullies are alternately formed on any one surface of the opposite surfaces of the tilt slit 213, and because the locking gear 215 is provided on the inner surface of the tilt slit 213 in this way, a separate member is not necessary so that manufacturing costs can be reduced and the number of assembly processes can be reduced.

The resilient body 270 has a shape that surrounds an outer peripheral surface of the adjusting bolt 230, and an end of the resilient body 270 is coupled to the locking member 250 to be supported by the locking member 250 and an opposite end of the resilient body 270 is coupled to the adjusting bolt 230 to be supported by the adjusting bolt 230.

In order to apply a resilient restoring force to the locking member 250 in the rotational direction of the adjusting bolt 230, the resilient body 270 is configured such that the center thereof surrounds an outer peripheral surface of the adjusting bolt 230 and opposite ends thereof are coupled to the locking member 250 and the adjusting bolt 230, respectively.

Accordingly, because the locking member 250 is coupled to the locking gear 215 and the resilient body 270 is compressed in the rotational direction of the adjusting bolt 230 when the steering column is locked, the locking member 250 may be coupled to the locking gear 215 while being resiliently supported by the locking gear 215 by the resilient member 270.

Meanwhile, when the locking member 250 is coupled to the locking gear 215, the locking member 250 is normally coupled to the gullies of the locking gear 215 as illustrated in FIG. 5A but the locking member 250 may be coupled to the ridges of the locking gear 215 as illustrated in FIG. 5B.

That is, as the adjusting bolt 230 is rotated, the locking member 250 is rotated while the resilient body 270 is rotated and the locking boss 357 of the locking member 250 is engaged with the ridges or gullies of the locking gear 215.

In FIG. 5A, because the resilient body 270 is compressed in the rotational direction of the adjusting bolt 230 to resiliently support the locking gear 215 while the locking boss 357 is coupled to the gullies of the locking gear 215, the locking boss 357 may be stably coupled to the locking gear 215.

Meanwhile, as illustrated in FIG. 5B, when the locking boss 357 of the locking member 250 is engaged with the ridges of the locking gear 215, the locking member 250 cannot rotate further so that the resilient body 270 is further compressed in the rotational direction.

Accordingly, because the resilient body 270 compressed in the rotational direction comes to have a restoring force, the locking member 250 resiliently supports the locking gear 215 in the rotational direction of the adjusting bolt 230.

Because the resilient support force of the resilient body 270 allows the locking boss 357 of the locking member 250 engaged with the ridges of the locking gear 215 to be coupled to the gullies of the locking gear 215 if an impact is applied due to a collision of the vehicle, the locking member 250 is stably coupled to the locking gear 215 so that the adjusting bolt 230 cannot be slid along the tilt slits 213.

In this way, the resilient body 270 is provided such that the locking member 250 can be stably coupled to the locking gear 215 as the resilient body 270 is further compressed in the rotation direction even if the locking boss 357 of the locking member 250 is engaged with the ridges of the locking gear 215, and accordingly, the steering column can be locked, a pop-up phenomenon of the steering shaft 204 can be prevented, and the safety of the driver can be guaranteed when the vehicle collides.

In addition, because the locking gear 215 is provided on an inner surface of the tilt slit 213 and the shape of the locking member 250 is simple, manufacturing costs can be reduced and the steering column can be stably locked even when a tooth-on-tooth phenomenon, in which the locking member 250 is engaged with the ridges of the locking gear 215, occurs.

Furthermore, because the locking member 250 is resiliently coupled to the locking gear 215, damage to the locking member 250, the locking gear 215, and the adjusting lever 243 can be prevented.

An example of the resilient body 270 may be a coil spring, but may have any shape as long as the resilient body 270 surrounds the body 235 of the adjusting bolt 230 such that one end thereof is coupled to the locking member 250 and an opposite end thereof is coupled to the adjusting bolt 230 so that the locking member 250 may be resiliently supported by the locking gear 215.

Furthermore, the resilient body 270 is compressed in the rotational direction by a difference between the rotation amounts of the locking member 250 and the adjusting bolt 230, and if the locking member 250 is engaged with the ridges of the locking gear 215, the resilient body 270 is further compressed in the rotational direction by the difference between the ridges and gullies so that the lever force that is applied by the driver can be made stronger or weaker according to the strength of the resilient body 270.

Then, if the strength of the resilient body 270 is set to be high, the lever force applied by the driver increases so that the driver may feel an inconvenience and the locking member 250 is engaged with the locking gear 215 even when the tilt lock is released so that the tilting operation cannot be smoothly performed as well, and if the strength of the resilient body 270 is set to be low, the resilient support force of the locking member 250 engaged with the locking gear 215 is low so that the steering column cannot be stably locked.

Accordingly, the resilient body 270 should be compressed such that the locking member 250 may be resiliently supported by the locking gear 215 in the case of a tilt lock, and the locking member 250 should be rotated to be released from the engagement with the locking gear 215 while the resilient body 270 is not compressed when the tilt lock is released.

A first fixed part 371, one end of which is bent to be coupled to the locking member 250, is formed in the resilient body 270, and the assembly hole 351, to which the bent first fixed part 371 is coupled to be supported by the assembly hole 351, is formed in the locking member 250.

Furthermore, because a second fixed part 372, an end of which is bent to surround an outer peripheral surface of the body 235 to be supported, is formed in the resilient body 270, the resilient body 270 is coupled to the locking member 250 and the adjusting bolt 230.

Because a planar part 232, an outer peripheral surface of which is recessed, is formed in the body 235 of the adjusting bolt 230, the second fixed part 372 surrounds the body 235 having the planar part 232 to be supported, and the resilient body 270 is rotated together as the adjusting bolt 230 is rotated.

Meanwhile, the actuating cam 241 of the tilt locking member 240 is rotated together with the adjusting lever 243, and a coupling part 245 corresponding to the planar part 232 of the adjusting bolt 230 protrudes from an inner peripheral surface of the actuating cam 241 so that the adjusting bolt 230 may be rotated together with the actuating cam 241.

The coupling part 245 is coupled to and supported by the planar part 232, and the adjusting bolt 230 is rotated together with the actuating cam 241 if the adjusting lever 243 is rotated.

In the tilting operation of the steering column of the vehicle, if the driver releases the adjusting lever 243, the actuating cam 241 is rotated such that the opposite sides of the plate bracket 210 are released while the distance between the actuating cam 241 and the fixed cam 247 becomes narrower, and accordingly, the frictional support force between the plate bracket 210 and the distance bracket 220 disappears and the position of the adjusting bolt 230 may be adjusted along the tilt slits 213.

In contrast, if the adjusting bolt 230 is rotated as the actuating cam 241 is rotated when the driver locks the adjusting lever 243, the resilient body 270 that is fixed to the adjusting bolt 230 is rotated, and the resilient body 270 rotates the locking member 250 such that the locking member 250 is coupled to the locking gear 215.

At the same time, as the actuating cam 241 is rotated such that the distance between the actuating cam 241 and the fixed cam 247 becomes longer, the fixed cam 247 and the head 237 presses the plate bracket 210 and the plate bracket 210 frictionally supports the distance bracket 220 to fix the steering column.

As illustrated in FIG. 6, in another embodiment in which the resilient body 270 is coupled to the adjusting bolt 230, a coupling hole 436 may be formed in the body 235 of the adjusting bolt 230 and the second fixed part 372 may be fixedly coupled to the coupling hole 436.

The second fixed part 372 is coupled to the coupling hole 436 such that the resilient body 270 is fixed to the adjusting bolt 230, and the resilient body 270 is rotated together with the adjusting bolt 230 when the adjusting lever 243 is locked or released.

Meanwhile, because the steering column is fixed while the opposite inner surfaces of the plate bracket 210 and the opposite outer surfaces of the distance bracket 220 are frictionally supported during a locking operation after the tilting operation is completed, the inner surfaces of the plate bracket 210 need to press the outer surfaces of the distance bracket 220.

Accordingly, as illustrated in FIG. 7, the locking member 250 and the resilient body 270 are accommodated in the tilt slits 213 of the plate bracket 210.

That is, in order for the locking member 250 and the resilient body 270 to be accommodated within the tilt slits 213 of the plate bracket 210, the thickness of the coupled part of the locking member 250 and the resilient body 270 are equal to or smaller than the thickness of the plate bracket 210 in the drawings, and accordingly, the first fixed part 371 of the resilient body 270 can be prevented from being extracted from the assembly hole 351 because the resilient body 270 does not protrude.

Furthermore, if the tilt locking member 240 presses the plate bracket 210 when the adjusting lever 243 is locked, the plate bracket 210 may frictionally support the distance bracket 220.

Furthermore, as illustrated in FIG. 8, a stepped accommodation part 623 may be formed such that the resilient body 270 may be accommodated in the through-hole 221 of the distance bracket 220 so that the inner surface of the plate bracket 210 may press the outer surface of the distance bracket 220.

A portion of the outer surface of the distance bracket 220 may be frictionally supported by the plate bracket 210 due to the accommodation part 623, and the stepped surface of the accommodation part 623 prevents the movement of the resilient body 270 and thus prevents the first fixed part 371 of the locking member 250 from being extracted from the assembly hole.

According to various embodiments of the present invention, the steering column of a vehicle includes the locking member and the locking gear such that the steering column can be fixed by a frictional support force between the plate bracket and the distance bracket, and a coupling support force between the locking member and the locking gear engaged with the locking member as the locking member is engaged with the locking gear so that the driver can be protected by preventing the steering shaft from being popped up.

Further, the steering column of the vehicle includes the resilient body coupled to the locking member and the adjusting bolt such that the locking member is coupled to the locking gear while supporting the locking gear in the rotational direction of the adjusting bolt. Therefore, even when the locking member is engaged with the ridge of the locking gear, the resilient body is further compressed as much as a difference between a ridge and a gulley of the locking gear to prevent the locking member, the locking gear, or the adjusting lever from being broken.

In addition, when the vehicle collides, the locking member resiliently supports the locking gear so that the steering column of the vehicle can be stably locked.

Even if it was described above that all of the components of an embodiment of the present invention are coupled as a single unit or coupled to be operated as a single unit, the present invention is not necessarily limited to such an embodiment. That is, at least two elements of all structural elements may be selectively joined and operate without departing from the scope of the present invention.

Although a preferred embodiment of the present invention has been described for illustrative purposes, those skilled in the art will appreciate that various modifications, additions and substitutions are possible, without departing from the scope and spirit of the invention as disclosed in the accompanying claims. Therefore, the embodiments disclosed in the present invention are intended to illustrate the scope of the technical idea of the present invention, and the scope of the present invention is not limited by the embodiment. The scope of the present invention shall be construed on the basis of the accompanying claims in such a manner that all of the technical ideas included within the scope equivalent to the claims belong to the present invention.

What is claimed is:

1. A steering column of a vehicle, comprising:
   a plate bracket that surrounds a distance bracket that is coupled to an outer column, has tilt slits on opposite sides thereof, and has a locking gear in any one of opposite surfaces of the tilt slits;
   an adjusting bolt that has a body passing through the tilt slits and the distance bracket from a head thereof, and in which a fixed cam and an actuating cam are coupled to a side of the body opposite to the head in order to press or release opposite sides of the plate bracket;
   a locking member into which the adjusting bolt is inserted and which is coupled to or released from the locking gear; and
   a resilient body that is coupled to the locking member and the adjusting bolt in order to apply a resilient restoring force to the locking member in a rotational direction of the adjusting bolt,
   wherein one side of the resilient body is in contact with the locking member and another side of the resilient body is in contact with the distance bracket, and
   wherein a stepped accommodation part is formed in a through-hole of the distance bracket to accommodate the resilient body.

2. The steering column of claim 1, wherein a locking boss protrudes from one side of an outer peripheral surface of the locking member in a rotational direction towards the locking gear.

3. The steering column of claim 1, wherein a central portion of the resilient body surrounds an outer peripheral surface of the adjusting bolt and opposite ends of the resilient body are coupled to the locking member and the adjusting bolt, respectively.

4. The steering column of claim 1, wherein an assembly hole is formed in the locking member, and a first fixed part is formed in the resilient body by bending one end of the resilient body to be coupled to the assembly hole.

5. The steering column of claim 4, wherein a planar part, an outer peripheral surface of which is recessed, is formed in the body of the adjusting bolt, and a second fixed part, which is supported by and fixed to the planar part, is formed in the resilient body by bending an opposite end of the resilient body.

6. The steering column of claim 5, wherein a coupling part corresponding to the planar part protrudes from an inner peripheral surface of the actuating cam so that the adjusting bolt is rotated when the actuating cam is rotated.

7. The steering column of claim 4, wherein a coupling hole is formed in the body of the adjusting bolt, and a second fixed part, an end of which is fixedly coupled to the coupling hole, is formed in the resilient body.

8. The steering column of claim 1, wherein the locking member and the resilient body are accommodated in the tilt slits of the plate bracket.

9. The steering column of claim 1, wherein each of the locking member and the resilient body is provided in pair inside the tilt slits, such that a first pair of the locking member and the resilient body is coupled to the head of the adjusting bolt and a second pair of the locking member and the resilient body is coupled to the fixed cam.

* * * * *